United States Patent [19]

Stanley

[11] 4,352,858
[45] Oct. 5, 1982

[54] POLYURETHANE ADHESIVE COMPOSITIONS MODIFIED WITH A DICARBAMATE ESTER USEFUL IN LAMINATING SUBSTRATES

[75] Inventor: Henry Stanley, Cedar Grove, N.J.

[73] Assignee: National Starch and Chemical Corp., Bridgewater, N.J.

[21] Appl. No.: 299,352

[22] Filed: Sep. 4, 1981

[51] Int. Cl.$^3$ .................... C08G 18/79; C09J 3/02; B32B 27/40
[52] U.S. Cl. ................. 428/423.1; 156/331.4; 156/331.7; 525/458; 528/67
[58] Field of Search ............... 528/67; 525/458; 156/331, 331.4, 331.7; 428/423.1

[56] References Cited

U.S. PATENT DOCUMENTS

| | | | |
|---|---|---|---|
| 2,929,800 | 3/1960 | Hill | 260/77.5 |
| 3,094,495 | 6/1963 | Gemeinhardt | 525/458 |
| 3,284,539 | 11/1966 | McElroy | 260/858 |
| 3,490,987 | 1/1970 | Bauriedel | 161/190 |
| 3,496,045 | 2/1970 | Keberle et al. | 156/331 |
| 3,663,513 | 5/1972 | Kazama et al. | 260/75 NT |
| 3,666,835 | 5/1972 | Schloss | 260/858 |
| 3,829,533 | 8/1974 | Matsui et al. | 525/458 |
| 3,931,077 | 1/1976 | Uchigaki et al. | 260/24 |
| 3,969,301 | 7/1976 | Thurn | 260/30.4 N |
| 3,991,025 | 11/1976 | Kutch et al. | 260/24 |
| 4,193,832 | 3/1980 | Reischl et al. | 525/458 |
| 4,242,488 | 12/1980 | Stanley et al. | 528/45 |

OTHER PUBLICATIONS

Saunders et al., Polyurethanes, Part II, Interscience, N.Y. (1964) pp. 609–622.

Primary Examiner—H. S. Cockeram
Attorney, Agent, or Firm—Edwin M. Szala; Ellen T. Dec

[57] ABSTRACT

A modified polyurethane adhesive composition characterized by its improved bond strength and curing properties contains an isocyanate-terminated prepolymer and from 2.5 to 100% by weight, based on the prepolymer, of a dicarbamate ester compatible with the prepolymer and containing two free isocyanate groups. The resultant adhesive is suitable for hot-melt applications in bonding flexible substrates.

9 Claims, No Drawings

POLYURETHANE ADHESIVE COMPOSITIONS MODIFIED WITH A DICARBAMATE ESTER USEFUL IN LAMINATING SUBSTRATES

BACKGROUND OF THE INVENTION

This invention relates to modified polyurethane adhesive compositions having improved viscosity and bond strength characteristics. This invention also relates to a process for laminating substrates using the polyurethane compositions herein.

Polyurethane adhesives, because of their excellent adhesive properties, are particularly desirable for use in bonding substrates. The most widely used adhesives for preparing flexible packaging laminations are based on curable polyether and polyester urethanes of low molecular weight, which are supplied as one-part and two-part flammable solvent-borne systems, both of which cure by reaction of isocyanate (NCO) groups. Other solvent-borne adhesives are fully reacted polyurethanes of high molecular weight. Water-based urethane adhesives are also known in the art.

As an alternative to these adhesives, the 100%-reactive, solvent-free adhesive system may be used, which is of two distinct types: (a) the reactive liquid adhesive, which is applied at room temperature and cured by radiation or through chemical combination, and (b) the reactive hot-melt adhesive, a solid at room temperature which melts to a highly viscous liquid when heated to moderate temperatures (82°-121° C.), and is applied in the molten state. The hot-melt adhesive cures on contact with ambient moisture.

The reactive liquid urethane adhesives of type (a) may be composed of one or two parts. Unsatisfactory initial bond strength and short pot life after mixing are two disadvantages of the two-part adhesives. The reactive one-part adhesive is the most convenient of the reactive liquid adhesives, yet because of the high viscosity of such adhesives, a solvent or reactive diluent is normally added thereto prior to application. In addition, residual monomers which remain after curing radiation-curable reactive liquid adhesives may produce odors or undesirable extractables.

There are several hot-melt urethane adhesives of type (b) known in the art. These urethane-based systems are superior to conventional hot-melt adhesives, which latter adhesives depend on their high molecular weight for their cohesive properties and hence have high viscosities of from 5000 to 10,000 cps. at temperatures of 150°-190° C. Furthermore, the conventional hot-melt compositions generally contain a variety of ingredients and are plagued by stability problems because of the high temperatures involved in their use. Finally, because these compositions are not curing, they are thermoplastic and lack resistance to solvents and heat.

The typical hot-melt urethane adhesives of the prior art contain a polyurethane prepolymer of low viscosity (such as is exemplified in Belgian Pat. No. 835,022), to which are added tackifiers, copolymers, thermoplastic polymers, adhesion promoters, etc., in varying mixtures, to enhance the initial bond strength and overall performance of the prepolymer (see, in particular, U.S. Pat. Nos. 3,931,077 and 3,991,025). Usually a combination of such additives is necessary to achieve sufficient bond strength in adhesives of this type, resulting in complicated formulations.

Certain plasticizers such as diisooctyl adipate reduce the viscosity of the hot-melt adhesive at both elevated and room temperatures. While the reduction in viscosity at higher temperatures is highly desirable, the concomitant significant reduction in viscosity at room temperature is unacceptable for applications requiring the adhesive to have initial cohesive strength. Other viscosity-modifying compounds such as terpene resins, aliphatic hydrocarbon resins, aromatic hydrocarbon resins, rosin alcohol phthalate esters, zinc salt rosin and epoxy resins are generally incompatible with urethane prepolymers and are thus of little or no use. Rosin esters of low molecular weight alcohols such as ethylene glycol and pentaerythritol, while compatible in many cases, tend to increase the viscosity of urethane prepolymers at high temperatures while not significantly affecting the viscosity at room temperature. The residual acid groups found in commercially available rosin esters also engage in undesirable reactions with the urethane prepolymer, and the presence of the rosin ester adversely affects the cohesive strength of the urethane prepolymer.

A significant improvement in the modification of urethane prepolymers is represented by U.S. Pat. No. 4,242,488 issued Dec. 30, 1980 to Stanley et al. In this patent the additive employed in conjunction with the prepolymer is a monomeric carbamate ester which significantly decreases the viscosity of urethane prepolymers at higher temperature while only minimally decreasing or in some cases increasing the room temperature viscosity and cohesive strength of the prepolymer. However, the carbamate esters used therein are chemically non-reactive compounds, and although they enhance the uncured physical properties of the urethane prepolymers by physical means, they remain as an inert filler in the cured urethane prepolymer and detract from the cured urethane prepolymer in proportion to the amount used to modify the urethane prepolymer. As long as the performance requirements on the modified urethane prepolymer are modest, such as in the lamination of films used in flexible packaging, the decrease in performance of the cured prepolymer is fully acceptable. However, in more demanding applications such as the bonding of vinyl to particle board, and the lamination of automotive headliners and seat cushions, there is a need for a modified prepolymer having better curing performance.

Accordingly, it is an object of the present invention to provide a modified polyurethane adhesive composition of simple formulation having improved bond strength, stability and curing characteristics.

It is another object to provide a process for laminating substrates and to provide a laminated film assembly wherein the modified urethane composition described herein is employed as the adhesive.

SUMMARY OF THE INVENTION

The above and related objects are achieved in an improved modified polyurethane adhesive composition comprising an isocyanate-terminated prepolymer having a molecular weight of at least about 1000, and 2.5–100%, by weight, based on said prepolymer, of a dicarbamate ester of the general formula:

wherein R is a divalent hydrocarbon radical and R' is a divalent aliphatic radical, and said ester is compatible with said prepolymer and has a molecular weight of no more than about 1000.

Dicarbamate esters are known in the art but have been disregarded for use in polyurethane coating applications because of their crystalline properties, which were thought to be detrimental to the physical properties of the resultant polyurethane compositions. It has now been found that the dicarbamate ester, which through its two free isocyanate groups is reactive with hydroxyl and other active-hydrogen-containing compounds, contributes to the curing of the adhesive while simultaneously improving the bond strength of the uncured adhesive. When the dicarbamate ester coreacts with the prepolymer, it becomes part of the cured polymeric matrix of the adhesive and contributes to the properties of the cured prepolymer. This is to be contrasted with the monomeric, non-reactive carbamate ester of U.S. Pat. No. 4,242,488, which is a non-functional additive and actually impairs the cure of the adhesive by diluting the effect thereof. Furthermore, the adhesive herein can be applied at lower running temperatures than a typical polyester hot-melt adhesive. This results not only in a savings in energy but also in better stability of the adhesive on the applicator rollers. At the same time the compositions herein have a low vapor concentration of free diisocyanate at the temperatures at which they are utilized.

DESCRIPTION OF THE PREFERRED EMBODIMENTS

The isocyanate-terminated polyurethane prepolymers applicable herein are well known in the art. Suitable prepolymers with residual isocyanate groups are formed by reaction of a diisocyanate with a diol or polyol or mixtures of diols and/or polyols, wherein the diol, polyol or total mixture generally has a molecular weight of about 600 to 20,000. Examples of usable diols and polyols are polyalkylene or polyalkylene ether, polyester, polyacetal, polyamide, polyester polyamide or polythioether diols and polyols. Representative of the diisocyanates applicable herein are, for example, the aliphatic compounds such as trimethylene, tetramethylene, pentamethylene, hexamethylene, 1,2-propylene, 1,2-butylene, 2,3-butylene, and butylidene diisocyanates; the cycloalkylene compounds such as 1,3-cyclopentane, 1,4-cyclohexane, 1,2-cyclohexane and isophorone diisocyanates; the aromatic compounds such as m-phenylene, p-phenylene, 4,4'-diphenyl, 1,5-naphthalene and 1,4-naphthalene diisocyanates; the aliphatic-aromatic compounds such as methylene bis-phenyl, 2,4- or 2,6-tolylene (or mixtures thereof), 4,4'-toluidine, and 1,4-xylene diisocyanates; the nuclear-substituted aromatic compounds such as dianisidine, 4,4'-diphenylether and chlorodiphenylene diisocyanates; etc.

The prepolymer herein, which generally has a molecular weight of at least about 1000, with maximum molecular weight determined by such factors as, e.g., viscosity considerations, in an amorphous viscous liquid or semi-elastomer lacking crystallinity and having polymeric properties. In contrast, the dicarbamate ester used to modify the prepolymer in accordance with the present invention has a molecular weight of no greater than about 1000, preferably no greater than 800, and is a semi-solid or solid material, often a crystalline solid, with a well-defined softening or melting point.

In the formula given above for the dicarbamate estes used herein, the term "divalent hydrocarbon radical" refers to unsubstituted and substituted alkylene, cycloalkylene, arylene and alkarylene or aralkylene radicals. Representative such groups include ethylene, propylene, butylene, isobutylene, cyclohexylene, phenylene, tolylene, naphthalene groups, and the like. By the term "divalent aliphatic radical" is intended any hydrocarbon or other radicals such as, e.g., alkylene, cycloalkylene, alkarylene and aralkylene groups as well as ester and ether groups, except those where the oxygen atom would be directly bonded to an aromatic ring.

Preparation of the dicarbamate esters may be carried out by any one of several synthetic routes. The most common procedure involves reacting two moles of an organic diisocyanate for every mole of a dihydroxy compound in accordance with known processes. One such process is described in "Industrial and Engineering Chemistry", Vol. 46, No. 7, 1498 (1954), by H. L. Heiss, J. H. Saunders, M. R. Morris, B. R. Davis, and E. E. Hardy, wherein the dihydroxy compound is added slowly to the diisocyanate in a suitable glass container, with stirring, after which an induction period of 5 to 10 minutes may occur, followed by an exothermic reaction which causes the temperature to rise to 80° to 120° C. and small amounts of gas to be evolved. After the reaction has subsided (usually about 30 minutes), the reaction mixture is heated at 80° to 100° C. for 30 minutes to ensure complete reaction. As a second method the dihydroxy compound may be added all at once to the diisocyanate, or the diisocyanate may be added to the dihydroxy compound. For purposes herein, no purification or recrystallization of the product is ordinarily needed due to the comparatively high yield of product obtained by this reaction, and the dicarbamate ester so prepared is isolated and used directly in the preparation of the adhesive.

Suitable diisocyanates in the above-described procedure for preparing the dicarbamate esters include, for example, hexamethylene, cyclohexane and phenylene diisocyanate, and other diisocyanates such as those mentioned above for preparing the prepolymer. Mixtures of diisocyanates may also be used. The preferred diisocyanates herein are methylene-bis-phenyl diisocyanate, isophorone diisocyanate and toluene diisocyanate such as HYLENE TM (trademark of E. I. duPont de Nemours, Inc.)

The dihydroxy compounds suitable for preparing the dicarbamate esters must contain two hydroxyl groups attached to an aliphatic carbon atom. Hydroxyl groups attached to aromatic carbon atoms, such as those in phenols, for example, are good blocking groups, i.e., they are removed at moderate temperatures, and are thus not suitable in forming stable carbamate esters for use herein. Any aliphatic (e.g. alkyl, alkenyl, alkoxy), cycloaliphatic (e.g., cycloalkyl, cycloalkenyl, cycloalkoxy), and aromatic-aliphatic (e.g. aralkyl, alkaryl, aralkenyl) dihydroxy compounds are applicable herein, provided that they form a dicarbamate ester as defined above. Representative of these compounds are ethylene glycol, diethylene glycol, triethylene glycol, 1,2-propylene glycol, 1,3-propylene glycol, dipropylene glycol, tripropylene glycol, 1,4-butane diol, pentane diol, hexane diol, 1,4-cyclohexane dimethanol, 2-ethyl-1,3-hexane diol, 1,3-dihydroxy acetone, 1,4-cyclohexane diol, 2,2,4,4-tetramethyl-1,3-cyclobutane diol, 2,2,4-trimethyl-1,3-pentane diol, neopentyl glycol, di(2-hydroxyethyl)dimethylhydantoin, 2,2-dimethyl-3-hydroxypropyl-2,2-dimethyl-3-hydroxypropionate, hydroxyethyl hydroquinone and the like, and mixtures of the above. The preferred dihydroxy compounds herein are the alkylene and cycloalkylene glycols, such as ethylene glycol, diethylene glycol, triethylene glycol, propylene glycol, dipropylene glycol, tripropylene glycol, 1,4-butane diol, 1,6-hexane diol and 1,4-cyclohexane dimethanol.

It will be recognized by the practitioner that the choice of dihydroxy compound may depend on the diisocyanate employed. For example, some of the combinations mentioned above would not be compatible due to steric considerations, etc. In addition, the stoichiometric ratio of diisocyanate to diol must be about 2:1 in order to obtain the dicarbamate ester herein. The present invention is not limited to any particular method of preparing dicarbamate esters.

It also will be recognized that a mixture of dicarbamate ester and the carbamate ester disclosed in U.S. Pat. No. 4,242,488 may also be effective as a modifier of the prepolymer and is within the scope of this invention. The carbamate esters suitable for this purpose are adequately described in the above-noted patent, the disclosure of which is incorporated herein by reference.

The amount of dicarbamate ester added to the polyurethane or prepolymer is dependent on the particular ester and polyurethane prepolymer employed, but generally must be in the range of 2.5–100% by weight, based on the weight of said prepolymer. Preferred amounts are about 10–40% by weight, depending on the particular properties desired in the final product. A dicarbamate ester which is structurally very similar to the polyurethane prepolymer and which therefore tends to be more highly compatible can be used in higher amounts than one which is not so compatible therewith. For example, some of the dicarbamate esters which may have a tendency to impart stiffness to the final cured composition may overly contribute to this effect if used in too high an amount for a particular dicarbamate ester and polyurethane prepolymer. The dicarbamate ester must be post-added to the urethane prepolymer, and cannot be added before or during polymerization of the monomers in forming the prepolymer.

When the composition is used as a hot-melt adhesive it is applied in molten form to the substrate using any of the usual procedures. Any suitable coating apparatus can be used such as conventional hot-melt coaters including roller coater (gravure roller, reverse roller), curtain coaters, nozzles, sprays, doctor blades, etc., equipped with heated melting vessels or pots. A particularly effective coating apparatus is the Swiss Polylaminator Machine. The melting vessel (adhesive pan) may be purged with nitrogen gas to insure a longer pot life; however, the molten adhesive exhibits good stability even when such measures are not taken.

Coating of the substrate can be made nearly continuous by adding the adhesive composition to the adhesive pan as the adhesive is consumed by the coater. For the best bond strengths in flexible packaging laminations, the coating weight of the adhesive herein should be between 0.36 and 0.68 kg/ream, depending on the substrate and the amount of moisture present. For industrial laminations such as bonding foams for insulation, the coating weight of the adhesive will be substantially higher.

After the reactive hot-melt adhesive is coated on the substrate, bonding is accomplished by placing a second substrate over the coated surface at elevated temperatures and applying pressure for 2 or 3 seconds. If the second substrate applied is at room temperature, the pressure can usually be removed within one second, as the temperature at the bond will be rapidly reduced below 60° C. Alternatively, the lamination can be passed through a nip roll at temperatures of, e.g., 80°–85° C. The lamination is then allowed to cool below 60°. When the bonded, multi-layered substrate is cured in the presence of ambient moisture for, e.g., 20 hours at 40° C., and at 90% relative humidity, the full final adhesive strength is achieved. The cure of the hot-melt adhesive can generally be accelerated by adding a typical urethane catalyst to the modified prepolymer or by spraying the substrates with a water mist.

The flexible substrates which can be laminated using the reactive hot-melt adhesive are such materials as synthetic polymers, e.g., nylon; plastic; treated polyolefins such as low-density polyethylene or oriented polypropylene films; polyvinylidene chloride-coated films such as PVDC-coated ethylene glycol dimethyl terephthalate (Mylar is the trademark), polyether and polyester urethane foams; aluminum foil; paper; metals; asbestos; and other flexible substrates which can be laminated by conventional adhesives. It is to be noted that certain substrates which have surfaces which are inherently difficult to adhere, such as polyolefins, must be electrostatically treated (by corona discharge) before being coated with the reactive hot-melt adhesive to be suitable for the process herein. Typical end-use applications include lamination of films used in snack packages, vacuum pouches, unit packages, etc., and industrial laminations for the manufacture of insulating materials and automobile upholstery.

It is noted that a solvent may be added to the composition of this invention to form a solvent-based adhesive if desirable. Suitable solvents for this purpose include, for example, ethyl acetate, methyl ethyl ketone, tetrahydrofuran, methylene chloride, acetone, methyl isobutyl ketone, toluene and the like.

The following examples will illustrate the embodiments of the invention herein. In the examples, all parts and percentages are given by weight and all temperatures in degrees Celsius unless otherwise indicated.

VISCOSITY TEST

Viscosities are measured using a Brookfield viscometer by observing the reading of the scale of the instrument when a suitable rotating spindle is immersed in the sample. Because of the limitations of the instrument, viscosities over 8 million cps cannot be measured. In such cases, after manual inspection of the material it is described as having a viscosity greater than 8 million cps (>8 mil.) or much greater than 8 million cps (>>8 mil.). For measurement of viscosities at elevated temperatures the Thermosel (trademark) adaptation of the Brookfield procedure is employed, which uses an electrically heated cell and a sample container of closely controlled dimensions. All viscosities herein are expressed in centipoise.

EXAMPLE I

This example illustrates the preparation of a variety of isocyanate-containing dicarbamate esters useful in preparing the modified polyurethane compositions herein.

The dicarbamate esters designated as A-Q in Table I were prepared as follows:

The given amount of methylene-bis-phenyl diisocyanate or isophorone diisocyanate was charged to a reaction vessel equipped with thermometer, gas inlet tube, stirrer, and addition funnel. A stream of dry nitrogen gas was led into the vessel and maintained throughout the reaction. The given amount of the indicated dihydroxy compound was then added in one or two charges with stirring and the reaction mixture was heated to the given reaction temperature and reacted for the given period of time. At the end of the reaction period the dicarbamate esters, which in each case were liquids at the reaction temperatures, were poured hot from the reaction vessel. The materials were then examined as to their appearance, melting point and viscosity, and the physical properties of each dicarbamate ester are summarized in Table I.

EXAMPLE II

This example illustrates the preparation of various isocyanate-terminated prepolymers for use in preparing the modified polyurethane compositions herein.

The prepolymer compositions designated as AA-II in Table II were prepared in the following manner: A reaction vessel was set up equipped with thermometer, gas-inlet tube, stirrer, and an addition funnel. A stream of dry nitrogen gas was let into the vessel and maintained throughout the reaction.

TABLE I

| Compo-sition | Diisocyanate Type | Parts | Dihydroxy Compound Type | Parts | Reaction Conditions Time (hrs) | Temp. (°C.) | Melting or Softening Point and Appearance |
|---|---|---|---|---|---|---|---|
| A | Methylene-bis phenyl diisocyanate | 500 | triproplyene glycol | 192 | 4.35 | 100 | 35° C.; glassy solid |
| B | Methylene-bis phenyl diisocyanate | " | dipropylene glycol | 134 | 4 | 100 | " |
| C | Methylene-bis phenyl diisocyanate | " | triethylene glycol | 158.2 | 4 | 100 | semi-solid |
| D | Methylene-bis phenyl diisocyanate | " | ethylene glycol/triethylene glycol (1:1 molar ratio) | 31.0 / 79.1 | 4 | 100 | 80° C. |
| E | Methylene-bis phenyl diisocyanate | " | diethylene glycol | 106.2 | 4 | 100 | 50° C.; white solid |
| F | Methylene-bis phenyl diisocyanate | " | propylene glycol | 76.1 | 4 | 100 | 90° C.; white solid |
| G | Methylene-bis phenyl diisocyanate | " | propylene glycol/dipropylene glycol (1:1 molar) | 38.1 / 67.0 | 4 | 110 | 58° C.; glassy solid |
| H | Methylene-bis phenyl diisocyanate | " | dipropylene glycol/propylene glycol (2:1 molar) | 89.3 / 25.1 | 4 | 100 | 43° C.; glassy solid |
| I | Methylene-bis phenyl diisocyanate | " | 1,4-butane diol | 90.1 | 2 | 120 | 150° C.; crystalline solid |
| J | Methylene-bis phenyl diisocyanate | " | ethylene glycol | 62.1 | 2 | 120 | 150° C.; crystalline solid |
| K | Methylene-bis phenyl diisocyanate | 250 | dipropylene glycol/ tripropylene glycol (1:1 molar) | 33.5 / 48.0 | 4 | 100 | 42° C.; slightly amber |
| L | Methylene-bis phenyl diisocyanate | " | dipropylene glycol/1,6-hexane diol (1:1 molar) | 33.5 / 25.5 | 5 | 100 | white |
| M | Methylene-bis phenyl diisocyanate | " | tripropylene glycol/ 1,6-hexane diol (1:1 molar) | 48.0 / 25.5 | 5 | 100 | slightly amber |
| N | Methylene-bis phenyl diisocyanate | " | 1,4-cyclohexane dimethanol/ dipropylene glycol (1:1 molar) | 36.0 / 33.5 | 4 | 130 | 110° C.; crystalline solid |
| O | Methylene-bis phenyl diisocyanate | " | 2,2-dimethyl-3-hydroxypropyl-2,2-dimethyl-3-hydroxypropionate | 102.1 | 4 | 80 | 50° C.; crystalline solid |
| P | Isophorone diisocyanate | 222.3 | ethylene glycol | 31.1 | 5 | 80 | 39° C. |
| Q | Isophorone diisocyanate | " | 1,6-hexane diol | 50.9 | 5 | 80 | Viscous liquid |

TABLE II

| Compo-sition | Amount of Diisocyanate (g) | Polyol Type | Molecular Weight | Amount (g) | Reaction Time (hours) | % NCO theo. | % NCO Exp. |
|---|---|---|---|---|---|---|---|
| AA | 894.0 | polypropylene glycol | 700 | 1000 | 4 | 5.0 | 4.3 |
|  |  | polypropylene glycol | 400 | 414.8 |  |  |  |
| BB | 792.0 | polypropylene glycol | 700 | 1500.0 | 4 | 4.3 | 4.1 |
| CC | 187.5 | polypropylene glycol | 1000 | 500.0 | 4 | 2.3 | 2.8 |
| DD | 104.5 | polypropylene glycol | 2000 | 500.0 | 4 | 2.3 | 2.2 |
| EE | 957.5 | polypropylene glycol | 700 | 1081.0 | 3 | 5.0 | 4.3 |
|  |  | polypropylene glycol | 400 | 444.2 |  |  |  |
| FF | 638.3 | polypropylene glycol | 700 | 714.0 | 3 | 5.0 | 4.5 |
|  |  | polypropylene glycol | 400 | 296.1 |  |  |  |
| GG | 670.5 | polypropylene glycol | 700 | 750.0 | 3 | 4.3 | 4.5 |
|  |  | polypropylene glycol | 400 | 311.0 |  |  |  |
| HH | 804.6 | polypropylene glycol | 700 | 900.0 | 3.5 | 4.2 | 4.9 |
|  |  | polypropylene glycol | 400 | 373.2 |  |  |  |
| II | 217.5 | 1,6-hexane diol neo- | 2928 | 1500.0 | 3.5 | 1.8 | 1.4 |

TABLE II-continued

| Composition | Amount of Diisocyanate (g) | Polyol Type | Polyol Molecular Weight | Polyol Amount (g) | Reaction Time (hours) | % NCO theo. | % NCO Exp. |
|---|---|---|---|---|---|---|---|
| | | pentyl glycol adipate | | | | | |

The given amounts of polyol(s) and methylene-bis-phenyl diisocyanate were charged to the reaction vessel, and were heated, with stirring, at 100° C. for the given amount of time. The prepolymers thus formed were discharged from the reaction vessels and analyzed for their isocyanate content and their viscosities at room temperature (22°–26° C.) and at 100° C. The results are given in Table II, except for the viscosities of the prepolymers, which are given in Table III for more convenient comparison with the viscosities of the modified prepolymers.

EXAMPLE III

This example illustrates the preparation of various modified polyurethane compositions herein and compares their performance with compositions modified with typical plasticizers.

The modified compositions 1 to 20 in Table III were prepared by adding the given amount of the indicated molten modifier (dicarbamate ester or plasticizer, as control) to a heated sample of the given amount of indicated prepolymer and thoroughly mixing the two components until the modifier was completely dissolved in the prepolymer. The viscosities at about 100° C. and at room temperature for each resultant composition as compared with that of the prepolymer alone were evaluated as described above and are summarized in Table III.

It can be seen from the data that the modified compositions of this invention have a room temperature viscosity which is higher or not significantly lower than that of the prepolymer. In contrast, the plasticizers, which include both liquid and solid materials commonly used to modify the viscosity of prepolymer systems, significantly reduce the viscosity of the prepolymer at room temperature (see Compositions 17–20), thereby rendering the modified prepolymer unsatisfactory for applications requiring initial cohesive strength in the material.

TABLE III

| Modified Composition | Modifier Type | Modifier Percent on Prepolymer | Modifier grams | Prepolymer Type | Prepolymer grams | Viscosity (cps) about 100° C. Modified Composition | Viscosity (cps) about 100° C. Prepolymer | Viscosity (cps, in millions) about 22° C. Modified Composition | Viscosity (cps, in millions) about 22° C. Prepolymer |
|---|---|---|---|---|---|---|---|---|---|
| 1 | Ester A | 30.0 | 58.9 | FF | 196.3 | 3,200 | 2,000 | >8 | 7.04 |
| 2 | Ester B | 30.0 | 60.1 | FF | 200.5 | 2,350 | 2,000 | >8 | 7.04 |
| 3 | Ester A | 30.0 | 46.2 | CC | 153.9 | 2,300 | 1,030 | 2.64 | 0.488 |
| 4 | Ester A | 30.0 | 41.6 | DD | 138.8 | 960 | 880 | 0.2 | 0.056 |
| 5 | Ester P | 30.0 | 54.2 | EE | 180.7 | 2,350 | 2,800 | >8 | >8 |
| 6 | Ester Q | 30.0 | 54.4 | EE | 181.4 | 1,080 | 2,800 | 5.2 | >8 |
| 7 | Ester K | 30.0 | 27 | EE | 90 | 2,360 | 2,800 | >>8 | >8 |
| 8 | Ester L | 30.0 | 53.9 | AA | 179.6 | 2,22, | 2,160 | 8 | 6.32 |
| 9 | Ester M | 30.0 | 55.6 | AA | 185.3 | 1,440 | 2,160 | 5.04 | 8 |
| 10 | Ester K | 30.0 | 43.8 | AA | 146.0 | 2,300 | 2,560 | * | 7.72 |
| 11 | Ester K | 30.0 | 51.6 | BB | 172.0 | 1,680 | 1,000 | >8 | 1.37 |
| 12 | Ester K | 30.0 | 44.6 | CC | 148.6 | 2,200 | 1,030 | 2.1 | 0.488 |
| 13 | Ester K | 30.0 | 43.8 | DD | 145.9 | 1,280 | 880 | 0.148 | 0.056 |
| 14 | Ester K | 30.0 | 100.0 | II | 333.3 | 46,500 | 32,400 | 7.6 | 2.16 |
| 15 | Ester N | 40.0 | 62.0 | BB | 155.0 | 2,600 | 1,000 | 8 | 1.37 |
| 16 | Ester O | 30.0 | 352.1 | II | 1170.0 | 34,400 | 32,400 | 7.6 | 2.16 |
| **17 | Diisocyanate adipate | 18.8 | 19.9 | GG | 105.7 | 440 | 2,200 | 0.1 | 5.4 |
| **18 | 2-Ethylhexyl diphenyl phosphate | 20.0 | 19.4 | GG | 97.2 | 420 | 2,950 | 0.2 | 2.7 |
| **19 | Butyl benzyl phthalate | 20.0 | 17.6 | HH | 88.0 | 360 | 2,950 | 0.3 | 2.72 |
| **20 | 1:1 dipropylene glycol benzoate to diethylene glycol benzoate | 20.0 | 20.2 | HH | 100.9 | 520 | 2,950 | 0.8 | 2.72 |

*Not determined
**Controls

EXAMPLE IV

This example illustrates the performance of a modified prepolymer composition as a solvent-free adhesive system in the making of upholstery.

A modified polyurethane composition was prepared by heating together, with stirring, in a 5-liter flask purged with nitrogen gas 1245 g of polypropylene glycol of molecular weight 700, 516.3 g of polypropylene glycol of molecular weight 400, and 3.8 g of Modaflow (trademark of Monsanto Co. for a flow-control agent which facilitates wetting of the substrate, improves levelling and eliminates pinholes in the adhesive). Then 938.7 g of methylene-bis-phenyl diisocyanate was added and the mixture was reacted for 3.5 hours at 100° C. to produce a polyurethane prepolymer. After this reaction, 1079.8 g of dicarbamate ester H was added with thorough mixing until the ester dissolved in the reaction mixture. The product was a tough, elastic material with substantial cohesive strength and non-flowing properties at room temperature. On evaluation the product was found to have an isocyanate content of 5.4% and a viscosity-temperature curve as follows:

| Temperature (°C.) | Viscosity (cps) |
|---|---|
| 107 | 3,000 |
| 100 | 8,000 |
| 93 | 9,250 |

| Temperature (°C.) | Viscosity (cps) |
|---|---|
| 88 | 13,500 |
| 79 | 27,000 |
| room temperature | >>8 million |

To test its suitability as a hot-melt adhesive, the composition thus prepared was applied at 88°-93° C. via application rollers to the cloth-backed side of three vinyl films at thicknesses of 178-203 microns, 102-127 microns and 76-89 microns, respectively. A scrim-backed polyurethane foam of 1.2 cm thickness was thereafter bonded to each of the coated films. For the two laminations with adhesive thicknesses of 178-203 and 102-127 microns the bonding was very tight, with the initial bond strength estimated to be greater than 157 g/cm (400 g/in). A tearing bond (occurring through solidification of the adhesive) was observed after only 30 minutes at room temperature. The lamination with an adhesive thickness of 76-89 microns showed a lesser but still acceptable green bond strength. As a comparison, the typical polyester hot-melt adhesive would require a running temperature of 232° to 260° C. for comparable bond strength results.

During the first 30 minutes of lamination no significant curing of the adhesive occurred, with the bond strength due only to the enhanced physical properties of the uncured material. The cure rate of the material for the thickest adhesive application (178-203 microns) was monitored by use of infrared spectoscopy to note the disappearance of free isocyanate groups over a period of 72 hours at 50% relative humidity. After 16 hours the adhesive was thermoplastic. After 40 hours the adhesive retained some of its thermoplasticity and was not completely cured. After 72 hours full curing of the adhesive had taken place.

In none of the laminations was there bleeding of the adhesive through the scrim or cloth, a common problem with typical urethane adhesives, which have a viscosity sufficiently low to be applied by the equipment available, but do not have substantial cohesive strength at room temperature. In addition, the adhesive of this invention remained stable after three hours on the hot-melt application rollers. When a thin film of the adhesive was aged in an oven at 104° C. for 1 hour there was only a relatively minimal viscosity change of from 9250 cps to 11,000 cps at 93° C. Finally, the vapor concentration of free diisocyanate in the adhesive at the relatively low application temperature of 88°-93° C. is significantly lower than the threshold limiting value set for the diisocyanate at this temperature.

In summary, the present invention is seen to provide a modified polyurethane adhesive composition with improved bond strength, stability and curing characteristics over comparable formulations, as well as a process for laminating substrates therewith.

Now that the preferred embodiments of the present invention have been described in detail, various modifications and improvements thereon will become readily apparent to the practitioner. Therefore, the spirit and scope of the invention are to be limited only by the appended claims, and not by the foregoing specification.

What is claimed is:

1. An improved modified polyurethane adhesive composition comprising an isocyanate-terminated prepolymer having a molecular weight of at least about 1000, and 2.5-100% by weight, based on said prepolymer, of a dicarbamate ester reaction product of two moles of an organic diisocyanate and one mole of a dihydroxy compound, of the general formula:

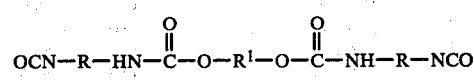

wherein R is a divalent hydrocarbon radical and $R^1$ is a divalent aliphatic radical, and said dicarbamate esters is compatible with said prepolymer and has a molecular weight no greater than 800.

2. The adhesive composition of claim 1 wherein said dicarbamate ester is present in an amount of 10-40% by weight, based on said prepolymer.

3. The adhesive composition of claim 1 wherein said dicarbamate ester is prepared from a diisocyanate selected from the group consisting of methylene-bis-phenyl diisocyanate, isophorone diisocyanate and toluene diisocyanate.

4. The adhesive composition of claim 1 wherein said dicarbamate ester is prepared from a dihydroxy compound selected from the group consisting of ethylene glycol, diethylene glycol, triethylene glycol, propylene glycol, dipropylene glycol, tripropylene glycol, 1,4-butane diol, 1,6-hexane diol, and 1,4-cyclohexane dimethanol.

5. The adhesive composition of claim 1 wherein said prepolymer is prepared from a diisocyanate selected from the group consisting of methylene-bis-phenyl diisocyanate, isophorone diisocyanate and toluene diisocyanate, and from a polypropylene glycol of molecular weight of about 400-2000 or from mixtures of two or more glycols.

6. In a process for laminating substrates with an adhesive, the improvement which comprises applying as the adhesive the composition of claim 1.

7. The process of claim 6 wherein the adhesive is applied as a hot-melt adhesive.

8. A laminated film assembly bonded by the adhesive composition of claim 1.

9. A laminated film assembly bonded by the process of claim 7.

* * * * *